(12) United States Patent
Kim

(10) Patent No.: US 7,666,552 B2
(45) Date of Patent: Feb. 23, 2010

(54) LITHIUM SECONDARY BATTERY AND SEPARATOR THEREFOR

(75) Inventor: Chan-Jung Kim, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 805 days.

(21) Appl. No.: 10/923,135

(22) Filed: Aug. 19, 2004

(65) Prior Publication Data

US 2005/0042517 A1  Feb. 24, 2005

(30) Foreign Application Priority Data

Aug. 21, 2003  (KR) .................. 10-2003-0057964

(51) Int. Cl.
*H01M 2/16* (2006.01)
(52) U.S. Cl. ................. 429/254; 429/144; 429/247
(58) Field of Classification Search ............... None
See application file for complete search history.

(56) References Cited

U.S. PATENT DOCUMENTS 5,532,075 A * 7/1996 Alexandres et al. ......... 429/54

FOREIGN PATENT DOCUMENTS

| JP | 01-152140 A | 6/1989 |
|---|---|---|
| JP | 11-060764 | * 3/1999 |
| JP | 11-60764 | 3/1999 |
| JP | 2000-212322 A | 8/2000 |
| JP | 2004-307711 A | 11/2004 |

OTHER PUBLICATIONS

Patent Abstracts of Japan for Publication No. 11-060764, Date of publication of application Mar. 5, 1999, in the name of K. Masayuki, et al.
Patent Abstracts of Japan for Publication No. 01-152140; dated Jun. 14, 1989 in the name of Tatsuya Ito, et al.
Patent Abstracts of Japan for Publication No. 2000-212322; dated Aug. 2, 2000 in the name of Satoshi Aoki, et al.
Patent Abstracts of Japan for Publication No. JP 2004-307711 (Application No. 2003-105381); dated Nov. 4, 2004 in the name of Kazunari Yamamoto, et al.

* cited by examiner

*Primary Examiner*—John S Maples
(74) *Attorney, Agent, or Firm*—Christie, Parker & Hale, LLP

(57) ABSTRACT

A lithium secondary battery includes an electrode assembly where a negative plate and a positive plate are rolled in the form of a spiral while interposing a separator with a modulus of elasticity of around 2.0 kg/mm² or less in the longitudinal direction. A can, inside of which the electrode assembly is mounted together with an electrolyte, is electrically connected to one of the negative plate and the positive plate of the electrode assembly. A cap assembly is fitted to the top of the can, and is electrically connected to the other of the positive plate and the negative plate of the electrode assembly.

11 Claims, 2 Drawing Sheets

LITHIUM SECONDARY BATTERY AND SEPARATOR THEREFOR

CROSS-REFERENCE TO RELATED APPLICATIONS

This application claims priority to and the benefit of Korean Patent Application No. 2003-0057964 filed on Aug. 21, 2003 in the Korean Intellectual Property Office, the entire content of which is incorporated herein by reference.

BACKGROUND OF THE INVENTION (a) Field of the Invention

The present invention relates to a lithium secondary battery, and in particular, to a separator for an electrode assembly.

(b) Description of Related Art

Generally, batteries are largely classified into a secondary battery which is capable of being repeatedly charged and discharged, and a primary battery which is not rechargeable and is disposed of after it is depleted. The battery is formed with various shapes, such as a cylindrical shape, a prismatic shape, and a pouch shape, depending upon the profile of the target appliance.

The secondary battery has an electrode assembly in which a negative plate and a positive plate are spirally wound to form of a "jelly-roll," while interposing a separator therebetween; a can mounting the electrode assembly therein together with an electrolyte; and a cap assembly fitted to the top of the can.

The positive plate of the electrode assembly is electrically connected to the cap assembly via an anode lead, and the negative plate thereof to the can via a cathode lead.

With the lithium ion secondary battery, lithium composite oxide is used as the positive active material to form the positive plate, and carbon is used as the negative active material to form the negative plate. The charging and the discharging occur due to the migration of lithium ions between the anode and the cathode.

The lithium ion secondary battery involves high voltage and high battery capacity, and hence, exhibits excellent performance characteristics for usage as a power supply in portable electronics. However, as an organic electrolyte is used, battery safety is problematic. In order to solve such a problem, there is a need for a separator having performance characteristics differentiated from those of other anhydrous secondary mini batteries. That is, it is very important in enhancing battery capacity and improving battery safety to provide an optimum separator for the battery design system, taking into account such characteristics as chemical stability, thickness, mechanical strength, and current breakage.

The separator basically separates the positive and the negative plates from each other, and maintains high ionic conductivity by absorbing an electrolyte needed for the battery reaction. Particularly in the case of the lithium ion secondary battery, the separator should also prevent the migration of unwanted materials caused by battery reaction, and secure battery safety when any abnormality occurs.

Furthermore, the separator inhibits the thickness expansion of the battery that occurs during the repeated cycles of charging and discharging.

The thickness expansion of the battery due to the repeated cycles of charging and discharging seriously deteriorates the battery reliability. In order to solve such a problem, a battery has been designed to inhibit gas generation therein by removing fine particles from the active material or using an additive in the electrolyte. However, the inhibition of thickness expansion by removing the fine particles from the active material or using an additive in the electrolyte is limited.

Furthermore, as lithium ion secondary batteries have been developed having a high capacity and a thin and flat structure, the separator is made thinner so that it cannot effectively absorb the expansion of the active material due to the repeated cycles of charging and discharging, thereby accelerating the thickness expansion.

SUMMARY OF THE INVENTION

In one exemplary embodiment of the present invention, there is provided a lithium secondary battery having an electrode assembly that includes a separator having a limited modulus of elasticity in its longitudinal direction. Such a limited modulus of elasticity serves to inhibit the electrode assembly from being thickness-expanded due to the repeated cycles of charging and discharging because as the modulus of elasticity of the separator in the longitudinal direction increases, the spiral patterned expansion becomes enlarged more easily.

In an exemplary embodiment of the present invention, the lithium secondary battery includes a separator having a modulus of elasticity of no greater than 2.0 $kg/mm^2$ in the longitudinal direction. In one embodiment, the modulus of elasticity is from 0.2 $kg/mm^2$ to 2.0 $kg/mm^2$ in the longitudinal direction.

According to one embodiment of the invention, a lithium secondary battery is provided and includes an electrode assembly where a negative plate, a positive plate, and a separator interposed therebetween are spirally wound in the form of a "jelly-roll." Notably, the separator has a modulus of elasticity of 2.0 $kg/mm^2$ or less in its longitudinal direction. A can mounts the electrode assembly therein together with an electrolyte, and is electrically connected to the negative plate or the positive plate of the electrode assembly. In this embodiment, a cap assembly is fitted to the top of the can with the electrode assembly, and is electrically connected to the positive plate or the negative plate of the electrode assembly.

BRIEF DESCRIPTION OF THE DRAWINGS

The above and other advantages of the present invention will become more apparent by describing exemplary embodiments thereof in detail with reference to the accompanying drawings in which.

DETAILED DESCRIPTION OF EXEMPLARY EMBODIMENTS

An exemplary embodiment of the present invention will now be described in detail with reference to the accompanying drawings.

Figure 1:
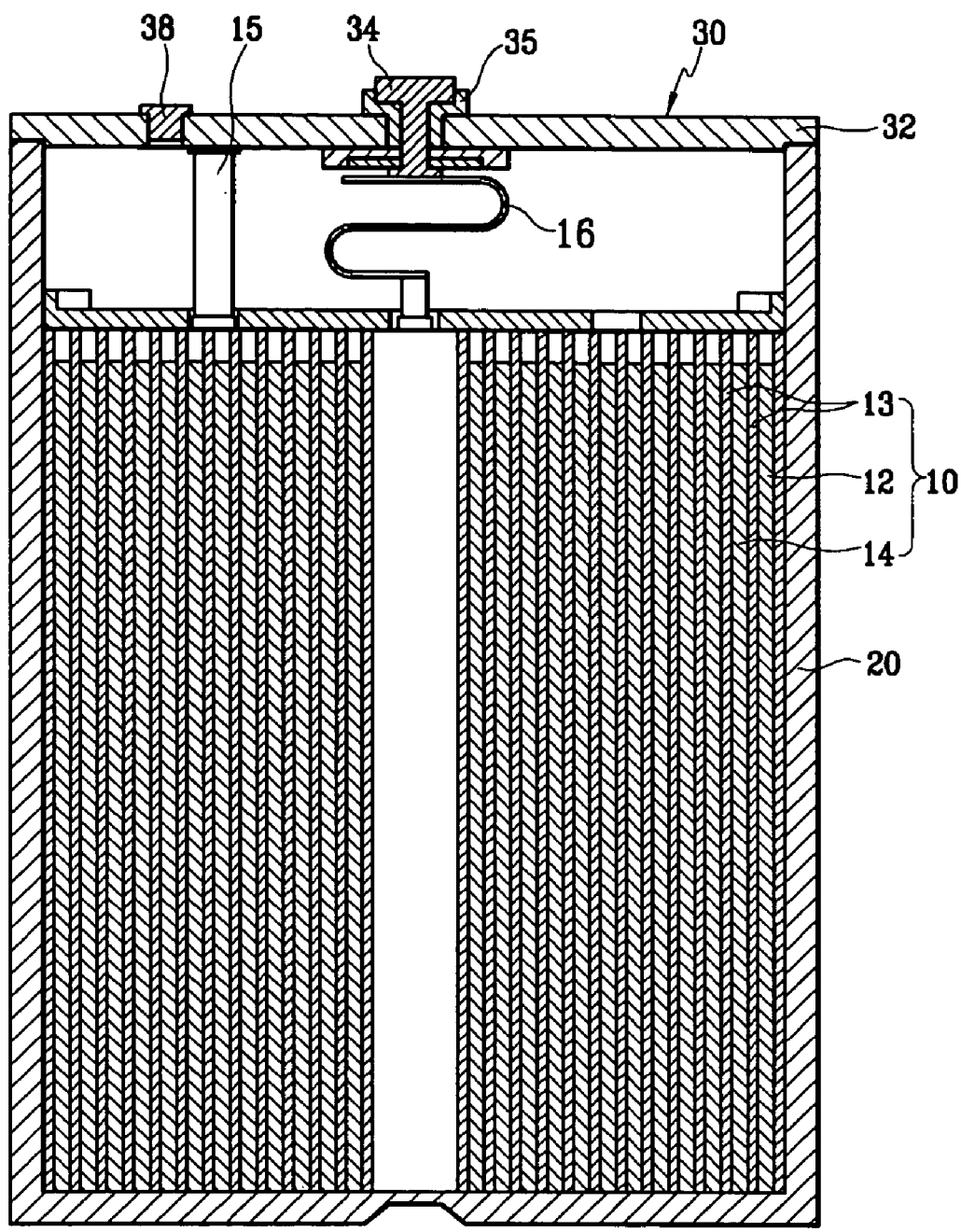
FIG. 1 is a sectional view of a lithium secondary battery according to an embodiment of the present invention.
Figure 2:
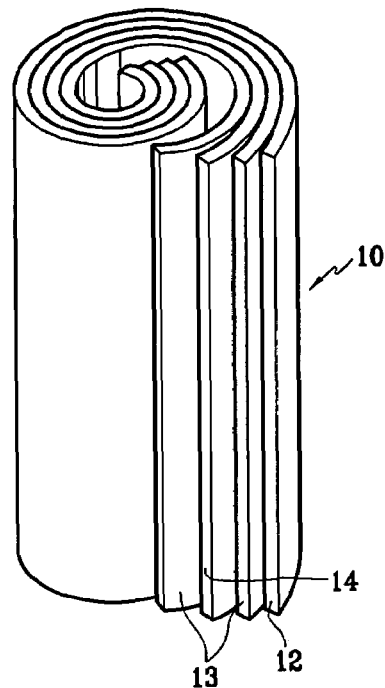
FIG. 2 is a perspective view of an electrode assembly for the lithium secondary battery according to the embodiment shown in FIG. 1.

As shown in FIGS. 1 and 2, the lithium secondary battery has an electrode assembly 10 where a negative plate 14 and a positive plate 12 are rolled in the form of a "jelly-roll" or spiral while interposing a separator 13 therebetween, a can 20 mounting the electrode assembly 10 therein together with an electrolyte and being electrically connected to the positive plate 12 of the electrode assembly 10, and a cap assembly 30 fitted to the top of the can 20 and being electrically connected to the negative plate 14 of the electrode assembly 10.

In this embodiment, the separator 13 has a modulus of elasticity of 0.2-2.0 kg/mm² in the longitudinal direction.

With the electrode assembly 10, the negative plate 14, the separator 13, and the positive plate 12 are sequentially tiered, and rolled in the form of a spiral.

In the case of a prismatic-shaped battery, the electrode assembly 10 rolled in the form of a spiral is inserted into the prismatic can 20, and pressed to reduce the whole thickness thereof.

In the case where the separator 13 is formed of a material having a high modulus of elasticity in the longitudinal direction, the separator 13 recovers to its initial state after the pressing, and maintains its prominent shape, thereby reducing the pressing effect. By contrast, in the case where the separator 13 is formed of a material having a low modulus of elasticity in the longitudinal direction, the separator 13 maintains its pressed state after the pressing, and hence, can maintain the advantages of a thin initial thickness.

With the lithium secondary battery according to this embodiment of the present invention, the separator 13 is formed of a material having a modulus of elasticity of 0.2-2.0 kg/mm² in the longitudinal direction. Accordingly, even after the pressing process is completed, it maintains its pressed state, and substantially retains its thin initial thickness.

When the modulus of elasticity of the separator 13 in the longitudinal direction is less than 0.2 kg/mm², it does not recover its initial shape even under slight deformation thereof by hand pressing, and hence, should be carefully handled.

By contrast, when the modulus of elasticity of the separator 13 in the longitudinal direction exceeds 2.0 kg/mm², the shape thereof after the pressing recovers closer to the shape thereof before the pressing, and hence, it is difficult to make the initial thickness of the separator 13 thereof thinner.

Non-limiting examples of separators having the requisite modulus of elasticity include single-layered, double-layered and triple-layered polymeric structures. Particularly preferred are single-, double-, and triple-layer films of polyethylene (PE), and/or polypropylene (PP), having a modulus of elasticity of 2.0 kg/mm² or less, more preferably 0.2-2.0 kg/mm². The separator 13 may alternatively be formed with or include other materials provided that the separator has a modulus of elasticity of 0.2-2.0 kg/mm² in the longitudinal direction.

As shown in FIG. 1, an anode lead 15 is connected to the positive plate 12, and a cathode lead 16 is connected to the negative plate 14. The cap assembly 30 has a cap plate 32 fitted to the opening portion of the can 20, a cathode terminal 34 insulated from the cap plate 32 by a gasket 35, and a plug 38 for sealing the electrolyte injection hole formed at the cap plate 32 after the injection of the electrolyte. The cathode lead 16 is connected to the cathode terminal 34, and the anode lead 15 is connected to the cap plate 32.

The cap assembly 30, the electrode assembly 10 and the can 20 may be constructed using the structure of a common lithium ion battery, and hence, detailed explanation thereof will be omitted.

The thickness of the electrode assembly after charging, and the thickness variation of the electrode assembly, as a function of the number of repeated cycles of charging and discharging, were measured using the lithium secondary batteries according to Examples 1 and 2 and Comparative Example 1. These measurement results are listed and illustrated in Table 1, and FIG. 3.

Example 1

Positive and negative plates 14 and 12, coated with electrode active materials, were separated from each other using a separator 13, and rolled in the form of a spiral to form an electrode assembly 10. The separator 13 had a modulus of elasticity within the range of 0.2-1.2 kg/mm² in the longitudinal direction, specifically 0.8 kg/mm². The electrode assembly 10 was inserted into a prismatic can 20, and an electrolyte was injected into the can 20 to fabricate a lithium secondary battery. The electrolyte was prepared by dissolving 1M of $LiPF_6$ in a mixture of ethylene carbonate (EC) and ethyl methyl carbonate (EMC), where the ratio of EC to EMC was 3:7.

Example 2

A lithium secondary battery was fabricated using a separator 13 with a modulus of elasticity of 1.6 kg/mm² in the longitudinal direction. The electrode assembly 10 and electrolyte were prepared in the same way as in Example 1.

Comparative Example 1

A lithium secondary battery was fabricated using a separator with a modulus of elasticity of 3.2 kg/mm² in the longitudinal direction. The electrode assembly 10 and electrolyte were prepared in the same way as in Example 1.

Figure 3:
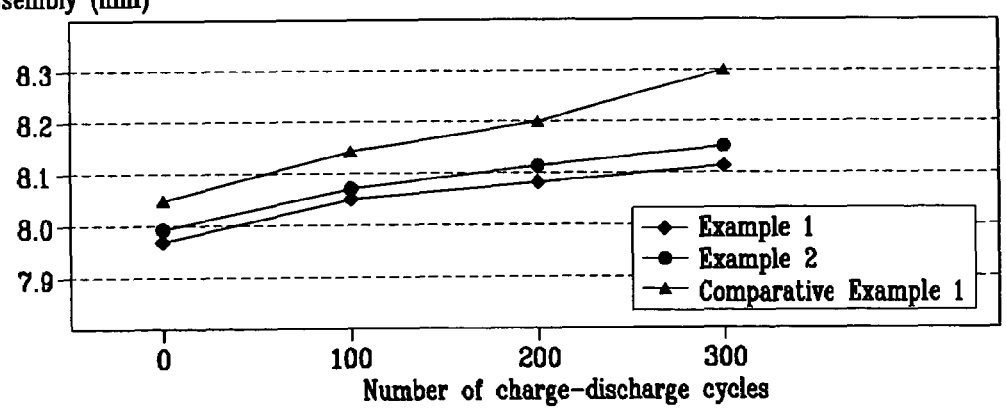
FIG. 3 is a graph illustrating the thickness variation as a function of the repeated cycles of charging and discharging, using the lithium secondary batteries according to Examples 1 and 2 and Comparative Example 1.

After the electrode assemblies were formed in Examples 1 and 2 and Comparative Example 1, the thickness of the assemblies was measured before pressing and after pressing. After the prismatic batteries were fabricated, the thickness of the assemblies was measured after standard initial charging. The measurement results are listed in Table 1. All three Examples were subjected to charge-discharge cycles, and the thicknesses of their electrode assemblies were measured at the initial state, and after 100, 200, and 300 charge-discharge cycles, respectively. The measurement results are illustrated in FIG. 3.

Twenty-five batteries were fabricated according to each of Examples 1 and 2 and Comparative Example 1, and their thicknesses were measured, as described above. The average measurement results are listed and illustrated in Table 1 and FIG. 3.

TABLE 1

| | Thickness of electrode assembly (mm) | | |
|---|---|---|---|
| Division | Before pressing | After pressing | After initial charge |
| Example 1 | 6.10 | 6.07 | 7.97 |
| Example 2 | 6.10 | 6.07 | 7.99 |
| Comp. Example 1 | 6.11 | 6.10 | 8.05 |

As shown in Table 1, Examples 1 and 2 had electrode assembly thicknesses after pressing that were reduced by about 0.03 mm, compared to their respective thicknesses before pressing. Comparative Example 1 was reduced by 0.01 mm after pressing. The reduction in thickness due to the pressing was therefore more significant in the electrode assemblies of Examples 1 and 2. The difference in results corresponds to differences in the moduli of elasticity of Examples 1 and 2, compared to Comparative Example 1. Separators formed of a higher modulus material have a greater tendency to revert back to their original, undeformed (non-pressed) configuration (thickness). Shape recovery is less pronounced in low modulus materials. Accordingly, a separator with a low modulus of elasticity can be more advantageous in fabricating thin and flat batteries.

In relation to the thickness of the electrode assembly after the initial charging, the thickness of the electrode assembly according to Example 1, using a separator with the lowest modulus of elasticity, was thinner by about 0.08 mm than that of the electrode assembly according to Comparative Example 1, which used a separator with a relatively high modulus of elasticity.

Furthermore, FIG. 3 shows that the thickness variation of the electrode assemblies according to Examples 1 and 2, which used a separator 13 with a relatively low modulus of elasticity pursuant to the number of charge-discharge cycles, is less than that of the electrode assembly according to Comparative Example 1, which used a separator with a relatively high modulus of elasticity.

Moreover, as the number of charge-discharge cycles increased, the thickness variation became more significant in the case where the separator had a relatively high modulus of elasticity.

The thickness variations of the electrode assemblies of Examples 1 and 2 after repeated charge-discharge cycles were somewhat reduced by the separator with a low modulus of elasticity. Therefore, lowering the modulus of elasticity of the separator is highly effective in reducing the electrode assembly expansion.

In one embodiment of the invention, a lithium secondary battery is provided with the separator having a low modulus of elasticity in its longitudinal direction so that the pressing effect is exerted sufficiently. In this embodiment, it is possible to maintain a post-pressing thickness of the electrode assembly that is 0.06 mm or less than that related to the conventional case, and to fabricate a thin and flat battery.

It is also possible with this embodiment to more effectively inhibit the electrode assembly's expansion in thickness after repeated charge-discharge cycles. The thickness expansion of the electrode assembly, in this embodiment, can be decreased by 0.15 mm or more after 300 repetitions of charging and discharging. In this way, the reliability related to the battery thickness can be enhanced.

Although exemplary embodiments of the present invention have been described in detail hereinabove, it should be clearly understood that many variations and/or modifications of the basic inventive concept herein taught which may appear to those skilled in the art will still fall within the spirit and scope of the present invention, as defined in the appended claims.

What is claimed is:

1. An electrode assembly comprising:
   a negative plate;
   a positive plate; and
   a separator interposed between the negative plate and the positive plate, and having a modulus of elasticity of from $0.2$ $kg_f/mm^2$ to $2.0$ $kg_f/mm^2$ in a longitudinal direction.

2. The electrode assembly of claim 1, wherein the separator is a single-layer comprising one or both of Polyethylene and Polypropylene.

3. The electrode assembly of claim 1, wherein the separator is a double layer comprising one or both of Polyethylene and Polypropylene.

4. The electrode assembly of claim 1, wherein the separator is a triple-layer comprising one or both of Polypropylene and Polyethylene.

5. A lithium secondary battery comprising:
   an electrode assembly comprising a negative plate and a positive plate and a separator with a modulus of elasticity of from $0.2$ $kg_f/mm^2$ to $2.0$ $kg_f/mm^2$ in a longitudinal direction, the separator between the negative plate and the positive plate, the electrode assembly rolled in the form of a spiral;
   a can within which the electrode assembly is mounted together with an electrolyte, the can being electrically connected to one of the negative plate and the positive plate of the electrode assembly; and
   a cap assembly fitted to the top of the can and being electrically connected to the other of the positive plate and the negative plate of the electrode assembly.

6. The lithium secondary battery of claim 5 wherein the separator has a single-layered structure comprising at least one of Polyethylene and Polypropylene.

7. The lithium secondary battery of claim 5 wherein the separator has a double layered structure comprising at least one of Polyethylene and Polypropylene.

8. The lithium secondary battery of claim 5 wherein the separator has a triple-layered structure comprising at least one of Polyethylene and Polypropylene.

9. The lithium secondary battery of claim 5 wherein the electrode assembly rolled in the form of a spiral is adapted to have a reduced thickness under pressing.

10. The lithium secondary battery of claim 5 wherein the cap assembly comprises a cap plate fitted to an opening portion of the can, a cathode terminal insulated from the cap plate by a gasket, and a plug sealing an electrolyte injection hole formed at the cap plate.

11. A separator for separating a negative and a positive plate in an electrode assembly of a lithium battery, wherein the separator is configured to be between the negative plate and the positive plate and wound in a spiral, and has a modulus of elasticity of from $0.2$ $kg_f/mm^2$ to $2.0$ $kg_f/mm^2$ in a longitudinal direction.

* * * * *